United States Patent [19]

Kakizawa et al.

[11] 4,304,003
[45] Dec. 1, 1981

[54] APPARATUS CONTROLLED BY A MICROPROCESSOR

[75] Inventors: Toshio Kakizawa, Kuwana; Itsuo Sakai, Inuyama, both of Japan

[73] Assignee: Tokyo Shibaura Denki Kabushiki Kaisha, Kawasaki, Japan

[21] Appl. No.: 86,332

[22] Filed: Oct. 19, 1979

[30] Foreign Application Priority Data

Oct. 31, 1978 [JP] Japan ................. 53-134244

[51] Int. Cl.³ .................. G01R 31/28; G06F 11/00
[52] U.S. Cl. ......................... 371/62; 364/119
[58] Field of Search ............ 364/119, 467, 200, 900; 371/62; 318/563, 565; 235/92 MT

[56] References Cited

U.S. PATENT DOCUMENTS

| 3,598,975 | 8/1971 | Miller | 364/119 |
| 3,795,800 | 3/1974 | Nimmo | 371/62 |
| 3,890,494 | 6/1975 | Meshek et al. | 364/119 |
| 3,919,533 | 11/1975 | Einolf, Jr. et al. | 371/62 |
| 4,160,155 | 7/1979 | Steele et al. | 364/467 |

FOREIGN PATENT DOCUMENTS 50-25783 8/1975 Japan.
51-32414 9/1976 Japan.
52-652 1/1977 Japan.

Primary Examiner—Jerry Smith
Assistant Examiner—Gary Chin
Attorney, Agent, or Firm—Oblon, Fisher, Spivak, McClelland & Maier

[57] ABSTRACT

A control circuit using a microprocessor comprises a time counting circuit; a main control logic circuit receiving a time signal from the time counting circuit; and an AC signal generator receiving a first signal from the time counting circuit and a second signal from the main control logic circuit. When the microprocessor is out of order, the AC signal takes continuous "1" or "0" level. The control circuit further comprises a detecting circuit for detecting an abnormal state of the AC signal and a control circuit for maintaining an apparatus to be controlled by the control circuit in a predetermined safe state when the detecting circuit detects the abnormal state of the AC signal.

7 Claims, 17 Drawing Figures

APPARATUS CONTROLLED BY A MICROPROCESSOR

BACKGROUND OF THE INVENTION

1. Field of the Invention

The present invention relates to an apparatus controlled by a microprocessor, and more particularly to an apparatus controlled in a predetermined safe state even when the microprocessor is in a faulty state.

2. Description of the Prior Art

As an example of an apparatus controlled by a control circuit using a microprocessor, there is a forced flow air heating apparatus, called an FF type heating apparatus. In such an apparatus, if the microprocessor goes wrong, the apparatus is controlled in an abnormal condition and thus might be in an extremely dangerous state. Therefore, it is demanded to detect a fault of the microprocessor in such a case and to control the apparatus so as to protect it from the danger. Nevertheless, a conventional apparatus of this type is not controlled under a safety state since it does not respond to a fault of the Summary of the Invention.

Accordingly, an object of the invention is to provide an apparatus controlled by a microprocessor which is to controlled in a safe state when the microprocessor is out of order.

According to an embodyment of the invention, there is provided an apparatus controlled by a microprocessor which has an integrated microprocessor, a detecting circuit and a protecting circuit. The integrated microprocessor includes a time counting logic circuit supplied with a reference input signals for counting the input signals and producing a first signal, a main control logic for receiving the first signal for producing a second signal and at least one output signal for controlling the apparatus, and an AC signal generating logic for receiving the first and second signals in order to produce an AC signal and a third signal whereby the AC signal is produced at a first operation state of the microprocessor and the AC generating logic has first and second levels repeated alternately with the third signal produced by a second operation state of a microprocessor and wherein the third signal has one of either the first or second levels for a predetermined period of time. The detecting circuit detects the AC signal and produces a first detection signal and detects the third signal and produces a second detection signal. The protecting circuit is connected to the detecting circuit and applies a fourth signal to the apparatus for putting the apparatus in a safety condition when the protecting means receives the second detection signal.

BRIEF DESCRIPTION OF THE DRAWINGS

A more complete appreciation of the invention and many of the attendant advantages thereof will be readily attained as the same becomes better understood by reference to the following detained description when considered in connection with the accompanying drawings, wherein.

DESCRIPTION OF THE PREFERRED EMBODIMENTS

Figure 1:
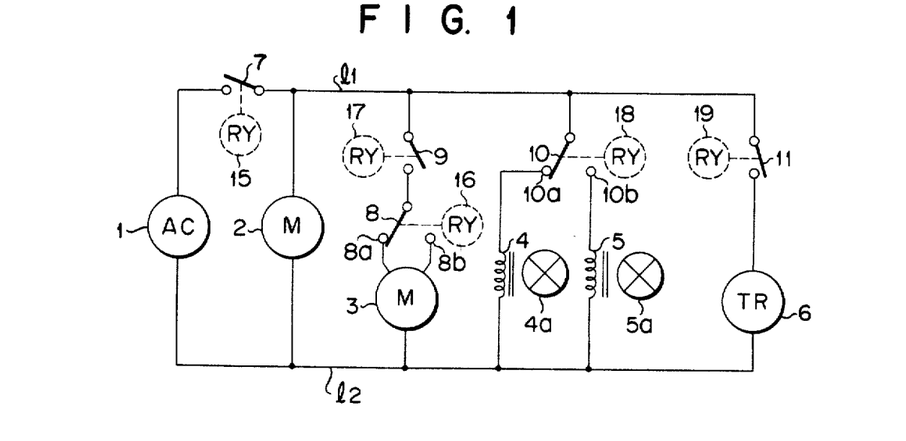
FIG. 1 shows a schematic diagram of a forced flow air heating apparatus controlled by a control circuit using a microprocessor.

Referring now to the drawings, wherein like reference numerals designate identical or corresponding parts throughout the several views, and more particularly to FIG. 1 thereof, reference numeral 1 designates an AC power source; 2 a motor for combustion for feeding air to a combustion section; 3 a fan motor for circulating air within a room through a heating section which is switchable between a high speed and a low speed; 4 a drive coil for an oil feeding valve 4a for high combustion; 5 a drive coil for an oil feeding valve 5a for low combustion; 6 an ignition transformer for igniting a burner (not shown). The AC power souce 1 is connected at one end with a line $l_1$ through a first switch 7 and at the other end with a line $l_2$. The first switch 7 is turned off when a first relay 15 is not activated (input="1"), and turned on when it is activated. The combustion motor 2 is connected between the lines $l_1$ and $l_2$. The fan motor 3 is connected at one end to the line $l_2$ and at the other end to the line $l_1$ through a second and third switches 8 and 9. When a second relay 16 is not activated (input="1"), the lever of the second switch 8 is switched on a contact 8a connected to a lead for high speed of the fan motor 3. When the relay 16 is activated (input="0"), the lever is switched on a contact 8b connected to a lead for low speed. The third switch 9 is closed when a 3rd relay 17 is activiated (input="0"). The coils 4 and 5 are connected at one ends to the line $l_2$ and at the other ends to the line $l_1$ through a fourth switch 10. The lever of the switch 10 contacts to a contact 10a when a 4th relay 18 is not activated (input="1"), and contacts to a contact 10b when it is activated (input="0"). The ignition transformer 6 is connected at one end to the line $l_2$ and the other end to the line $l_1$ through the switch 11. The ignition transformer 6 is closed only when a fifth relay 19 is activiated (input="0").

Figure 2:
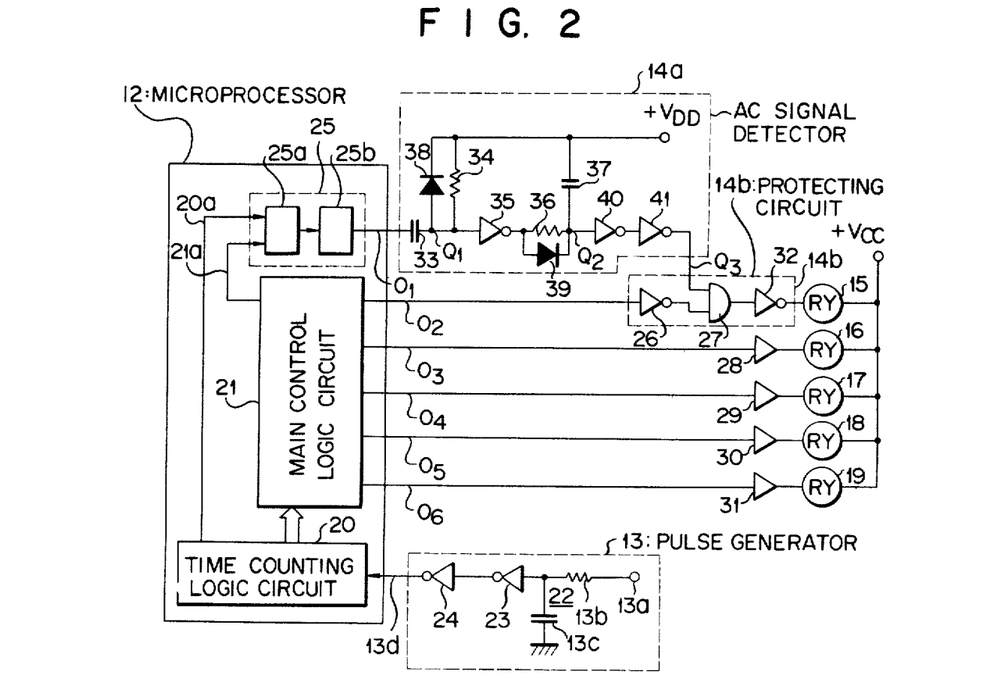
FIG. 2 shows a block diagram of a control circuit for controlling the apparatus shown in FIG. 1.

FIG. 2 shows an example of a control circuit for controlling the apparatus shown in FIG. 1. The control circuit includes a microprocessor 12, a pulse generator 13, a detecting circuit 14a for detecting an abnormality of an AC signal produced from the microprocessor 12, a circuit 14b which responds to an abnormality of the AC signal to control the apparatus shown in FIG. 1 in a given safe state, the relays 15 and 19, and drivers 28 to 31 for the relays 16 to 19.

The microprocessor 12 includes a time counting logic circuit 20, a main control logic circuit 21, and an AC signal generating logic circuit 25. The pulse generator 13 wave-shapes an AC input signal of 50 Hz, for example, supplied to the terminal 13a through an integrating circuit 22 including a resistor 13b and a capacitor 13c, and inverters 23 and 24 and applies the output signal 13d of 50 Hz to the input terminal of the time counting circuit 20. The time counting logic circuit 20 includes first, second, . . . counters. The first counter counts the "1" level of the input signal 13d for 0.1 second. That is to say, when counting the "1" level of the input signal 13d five times, the first counter produces a carry. The second counter counts one second by counting the carry of 0.1 second produced by the first counter ten times. The third counter performs a given time count on the basis of one second signal of the second counter. The first counter produces a first signal (also called a 0.1 sec signal or a flag setting signal) at the time that the carry is produced every 0.1 second. The first signal is applied to the main control logic circuit 21 and the AC signal generating logic circuit 25 at the same timing. Further, the every-one second signal of the second counter also is applied to the main control logic circuit. The operation of the time counting logic circuit 20 is controlled in accordance with a program shown in FIG. 3 which is set in the main control logic circuit 21.

The main control logic circuit 21 further stores programs shown in FIGS. 4A and 4B and to be described later. In response to an operation from outside or input information from the time counting logic circuit 20, the main control logic circuit 21 executes a given program to produce output signals of '1' or '0' at the output terminals $O_2$ to $O_6$. The main control logic circuit 20 also produces a second signal 21a which is not synchronous with the first signal 20a received from the time counting logic circuit 20.

The microprocessor 12 includes a flag memory 25a. The flag memory stores a flag when the AC signal generator logic circuit 25 receives the first signal 20a and the flag is cleared when the AC signal generating logic circuit 25 receives the second signal 21a. The first signal 20a is supplied to the flag memory 25a at the time that the first counter of the time counting logic circuit 20 is carried every 0.1 second and the second signal 21a is supplied to the same at a timing not synchronous with the first signal 20a. The AC signal generating logic circuit 25 includes a flip-flop circuit 25b. The FF circuit inverts its output level when the flag is cleared. Accordingly, an AC signal with first and second levels is applied to the output terminal $O_1$.

Figure 3:
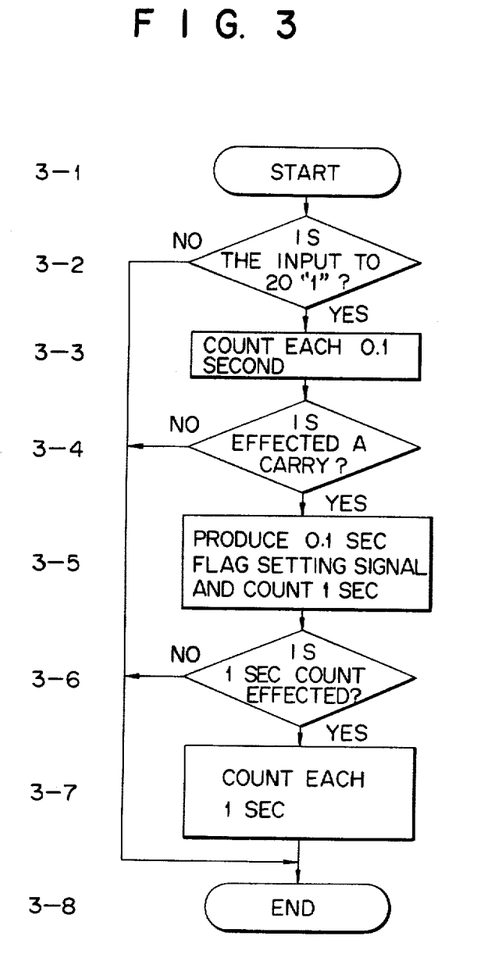
FIG. 3 shows a flow chart of a control program of a time counting circuit shown in FIG. 2.

How to control the time counting logic circuit 20 will be described with reference to FIG. 3. To start, a start button is operated (step 3-1). Then, it is checked as to if the input signal 13d to the time counting circuit 20 is '1' or not (step 3-2). If the level of the input signal 13d is not '1', the program execution steps to a step 3-8 and the time counting circuit does not effect a given operation. When the level of the input signal 13d is '1', the first counter of the time counting logic circuit counts the input signal 13d for 0.1 second (step 3-3). In a step 3-4, it is checked if a carry is effected in the first counter or not. When no carry is effected, the program execution advances to a step 3-8, and the time counting circuit 20 does not operate. When a carry is effected, the time counting circuit produces a first signal (flag setting signal) and the second counter counts the 0.1 Sec. signal. See step 3-5. Then, a step 3-6 checks as to if the second counter counts the 0.1 Sec. signal or not. When the count of 0.1 Sec. signal is not effected, the program execution is shifted to step 3-8 and the time counting circuit does not effect a given operation. On the other hand, when the count of 0.1 Sec. signal is effected, the second counter counts time every one second (step 3-7). If the every-one-second time count is performed, the time counting logic circuit 20 operates normally.

Figure 4A:
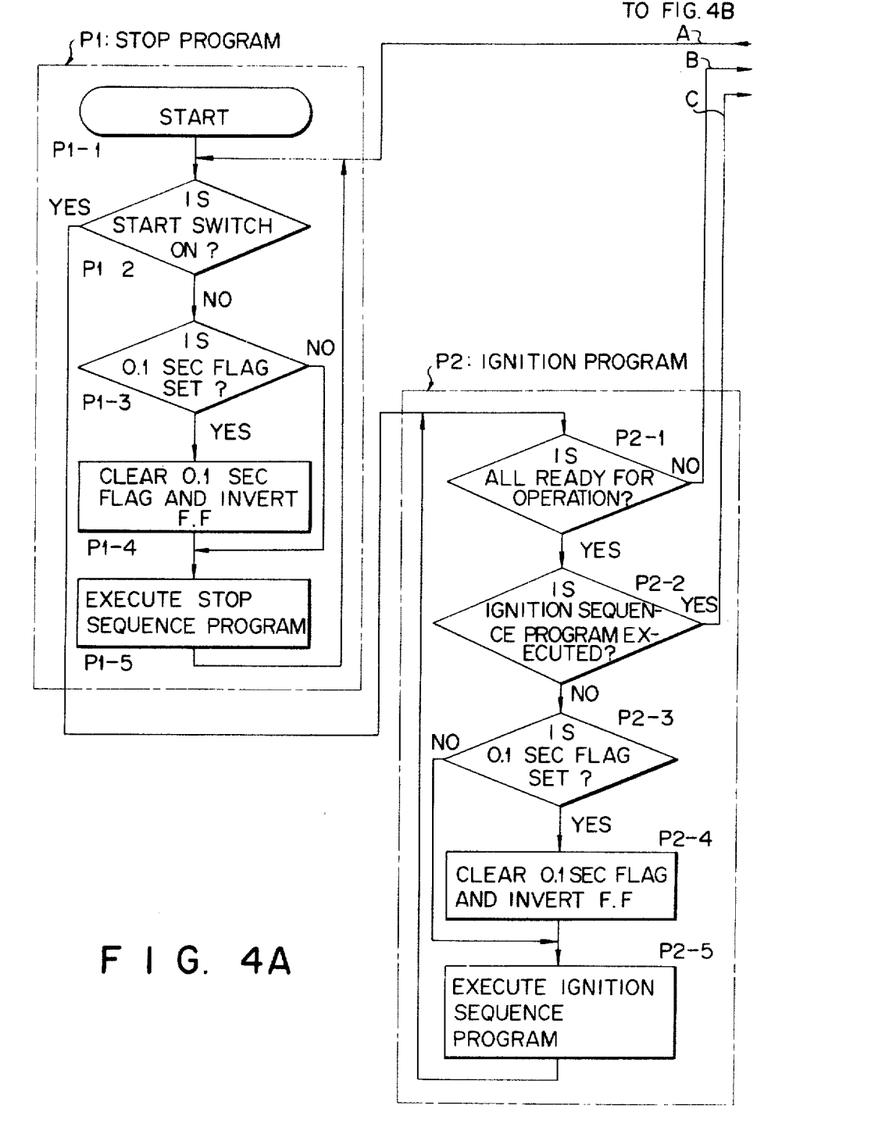
FIGS. 4A and 4B cooperate to form a flow chart of control programs of the control circuit shown in FIG. 1.
Figure 4B:
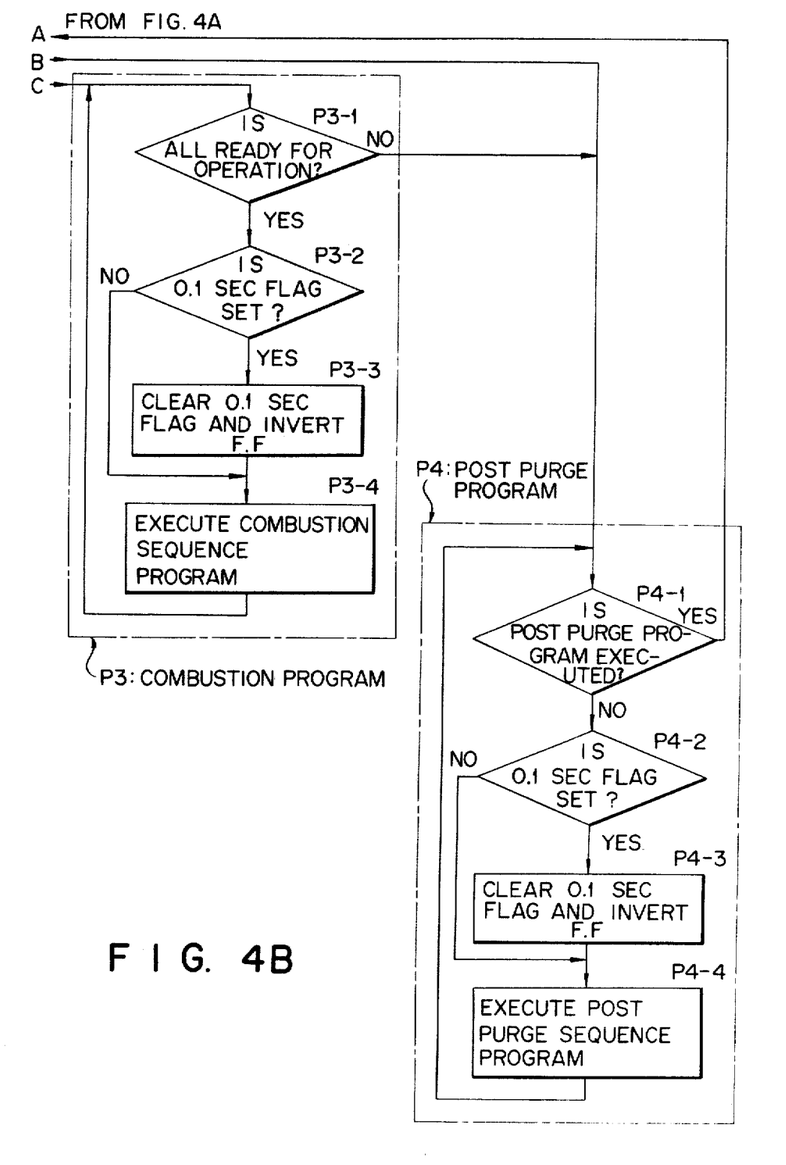

In the main control logic circuit 21, the programs shown in FIGS. 4A and 4B are further set and the main control logic circuit 21 operates in accordance with the programs. The programs shown in FIGS. 4A and 4B are roughly classified into a stop program P1, an ignition program P2, a combustion program P3, and a post purge program P4. Here, the post purge program is executed to purge remaining combustible gas after the combustion program P3 is executed.

In the stop program P1, following the start step P1-1, a step P1-2 checks if a start switch (not shown) is turned on or not. If it is not turned on, a step P1-3 checks if a flag (0.1 second flag) is set in the flag memory 25a of the microprocessor 12. If the 0.1 second flag is set therein, the 0.1 second flag is immediately cleared, and at the trailing edge of the 0.1 second flag the output level of the FF circuit 25b is inverted (step P1-4). Following the step P1-4, a stop sequence program controls the apparatus (FIG. 1) to stop it. In step P1-3, when the 0.1 second flag is not set, the program execution directly steps to a step P1-5 without passing the step P1-4. When the stop sequence program is executed, at least the first, third and fifth relays 15, 17 and 19 are deenergized (input="1"), the first, third and fifth switches 7, 9 and 11 are released. At the step P1-2, when the start switch is turned on, the ignition program P2 is executed.

In the ignition program P2, a step P2-1 checks if the apparatus is in 'ready-for-operation' (the apparatus shown in FIG. 1 is set in a given 'ready-for-operation') or not. When it is in 'ready-for-operation', a step P2-2 checks as to if the execution of an ignition sequence program is completed or not. If the ignition sequence program execution is not yet completed, a step P2-3 checks if the 0.1 second flag is set in the flag memory 25a of the microprocessor 12 or not. When the 0.1 second flag is set therein, the 0.1 second flag is immediately cleared to invert the output level of the FF. See step P2-4. When the execution of the program of the step P2-4 is completed, the ignition operation is performed in accordance with the ignition sequence program (step P2-5). When the 0.1 second flag is not set, the ignition sequence program is immediately executed without executing the step P2-4. Through the execution of the ignition sequence program, at least the first, third and fifth relays 15, 17 and 19 are energized (input="0") to close the first, third and fifth switches 7, 9 and 11. When the step P2-2 checks that the execution of the ignition sequence program is completed, the execution of the combustion program P3 is started.

In the combustion program P3, a step P3-1 checks if the apparatus shown in FIG. 1 is in an operable state or not. If it is in the operable condition, a step P3-2 checks as if the 0.1 second flag is set, it is immediately cleared to invert the output level of the flip-flop circuit 25b in a step P3-3. When the execution of the program in the step P3-3 is completed, the combustion operation is performed in accordance with the combustion sequence program in a step P3-4. In the step P3-2, if it is checked that the 0.1 second flag is not set, the program execution skips a step P3-3 to the execution of the combustion sequence program (step P3-4). Through the execution of the combustion sequence program, the fifth relay 19 is deenergized and the fifth switch 11 is open. Simultaneously, in accordance with the high or low combustion set, the second and fourth relays 16 and 18 are deenergized or energized, so that the third and fourth switches 8 and 10 are selectively switched in accordance of the setting of the low or high combustion.

When the apparatus is not in the operable condition in the step P2-1 of the ignition program P2 and the step P3-1 of the combustion program P3, the execution of the post purge program P4 is started.

In the post purge program P4, it is checked if the post purge is completed or not (step P4-1). If it is not completed, a step P4-2 checks if the 0.1 second flag is set in the flag memory 25a or not. If the post purge is not completed, it is checked if the 0.1 second flag is set in the flag memory 25a of the microprocessor or not. See step P4-2. If it is set, the 0.1 second flag is cleared to invert the output level of the flip-flop 25b (step P4-3). When the step P4-3, ends, the post purge is executed in accordance with the post purge sequence program (step P4-4). When the step P4-2 finds that the 0.1 second flag is not set, the program execution skips the step P4-3 to the execution of the post purge sequence program in step P4-4. When the step P4-1 finds the post purge ends, the program execution shifts to the step P1-2 of the stop program P1.

As described above, it is always checked if the 0.1 second flag is set or not in the flag memory of the AC signal generator 25. And if the 0.1 second flag is set, the output level of the flip-flop circuit 25b is inverted without fail by clearing the flag. So far as the microcomputer 12 or the pulse generator 13 does not go wrong, an AC signal is led to the output terminal $O_1$ of the AC signal generator 25. When it goes wrong, abnormality is detected in the AC signal at the output terminal $O_1$.

As seen from the process of the executions of the programs shown in FIGS. 4A and 4B, a signal to control the respective switches shown in FIG. 1 is produced from the main control section 21. The output terminals of the main control sections are denoted as $O_2$ to $O_6$. The same denotations are also applied to the output signals produced from the output terminals. FIG. 2 will further be described. The output $O_2$ is applied to one of the input terminals of the AND gate 27 through the inverter 26. The outputs $O_3$ to $O_6$ are supplied to the input terminals of the drive circuits 28 to 31, respectively. The output of the AND gate 27 is applied through an inverter 32 to the first relay 15 and the outputs of the drivers 28 to 31 are applied to the second to fifth relays 16 to 19. respectively.

The AC signal check circuit 14a is a logic circuit for applying a signal '1' to the output terminal $Q_3$. When an abnormality is not found in the AC signal at the output terminal $O_1$, and applying a signal '0' to the same when the AC signal is abnormal. The logic circuit 14a is comprised of a first capacitor 33 connected at one end to the output terminal $O_1$, a first diode 38 connected at the anode to the other terminal $Q_1$ of the first capacitor 33 and at the cathode to a positive terminal of a DC source $+V_{DD}$, a first resistor 34 connected in parallel to the first diode, a first inverter 35 connected between the other end of the first capacitor 33 and one end of a second resistor 36, a second capacitor 37 connected between the other end $Q_2$ of the second resistor 36 and a positive terminal of the DC source $+V_{DD}$, a second diode 39 connected between at the anode to one end of the second resistor 36 and at the cathode to the other end of the second resistor, and second and fourth inverters 40 and 41 connected in series between the other end of the second resistor 36 and the output terminal $Q_3$ of the circuit 14a.

Figure 5A:
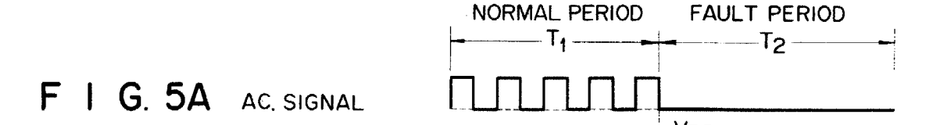
FIGS. 5A through 5F show wave forms at the respective portions of the control circuit shown in FIG. 2 when the AC signal generator shown in FIG. 2 produces a first abnormal output signal.
Figures 5B, 5C:
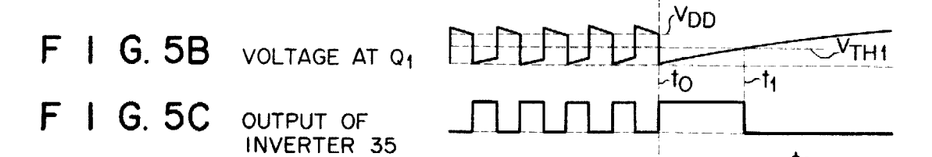
Figure 5D:
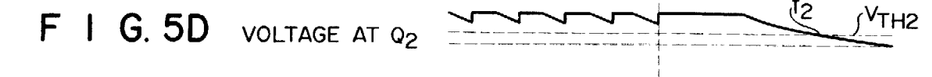
Figure 5E:
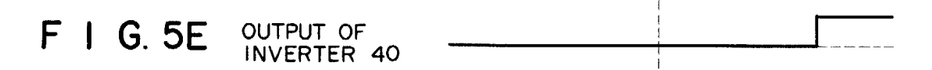
Figure 5F:
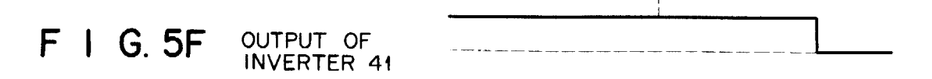

During a period that the pulse generator 13 produces a normal output signal 13d and the microcomputer 12 normally operates, the wave forms at the respective points of the circuit 14a are as shown in FIGS. 5A to 5F. In the period $T_1$, the capacitor 33 is charged through the resistor 34 by the power source $V_{DD}$ so long as the AC signal (FIG. 5A) is '0', so that a wave form at point $Q_1$ is as shown in FIG. 5B. Since the wave form at the point $Q_1$ is inverted by the inverter 35 and thus the wave form of the inverter output is as shown in FIG. 5C. Through the action of the capacitor 37, a wave form as shown in FIG. 5D appears at the point $Q_2$. The wave form of FIG. 5D is inverted by the inverter 40, so that the output of the inverter 40 becomes '0' as shown in FIG. 5E. The wave form of FIG. 5E is further inverted by the inverter 41, so that the output of the inverter 41, i.e. a wave form at the output point $Q_3$, becomes '1' as shown in FIG. 5F. The signal '1' shown in FIG. 5F is applied to the other input of the AND gate 27. When the signal $O_2$ is '0', the output of the AND gate 27 becomes '1' and the output of the inverter 32 becomes '0', so that the relay 15 is energized and the switch 7 is closed. When signal $O_2$ is '1', the output of the AND gate 27 is 1'0' and the output of the inverter 32 is '1', and therefore the relay 15 is deenergized to open the switch 7. At end of the period $T_1$, the AC signal becomes 1'0' and this state continues for the period $T_2$. This state corresponds to a situation that the apparatus shown in FIG. 1 can not be controlled normally. Specifically, the output level of the flip-flop circuit 25b remains "0". During the period $T_2$, the capacitor 33 is gradually charged from time $t_o$ by the power source $+V_{DD}$, as shown in FIG. 5B, and thus the potential at the point $Q_1$ gradually increases from time $t_o$ and becomes higher than the threshold voltage $V_{TH1}$ of the inverter 35 at time $t_1$. Accordingly, the output of the inverter 35 changes from "1" to "0" at time $t_1$. Accordingly the potential at point $Q_2$ gradually decreases from time $t_1$ and becomes lower than the threshold voltage $V_{TH2}$ of the inverter 40 at time $t_2$. As the result, the output of the inverter 40 changes from "0" to "1" at $t_2$ as shown in FIG. 5E. Also, the output of the inverter 41 changes from '1' to '0' at time $t_2$, as shown in FIG. 5F. So long as the voltage at the output terminal $Q_3$ is '0', the output of the AND gate 27 is '0' and the output of the inverter 32 is '1'. As a result, the relay 15 is deenergized and switch 7 is forcibly opened. In other words, the switch 7 keeps its off state irrespective of the level at output $O_2$, so that the apparatus shown in FIG. 1 is completely protected.

Figures 6A, 6B:
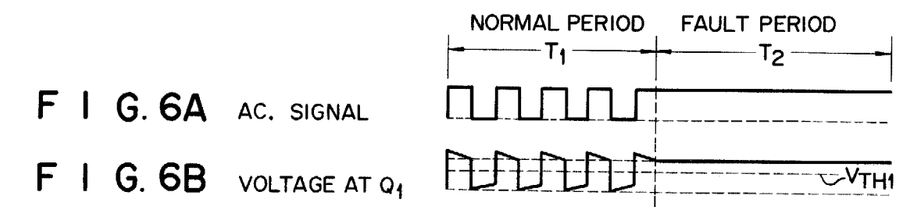
FIGS. 6A through 6F show wave forms at the respective portions of the control circuit shown in FIG. 2 when the AC signal generator shown in FIG. 2 produces a second abnormal output signal.
Figure 6C:
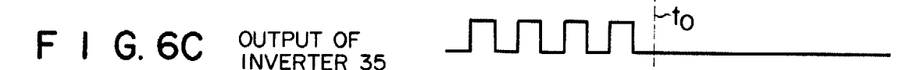
Figure 6D:
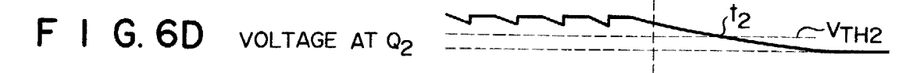
Figure 6E:
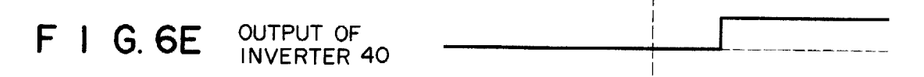
Figure 6F:
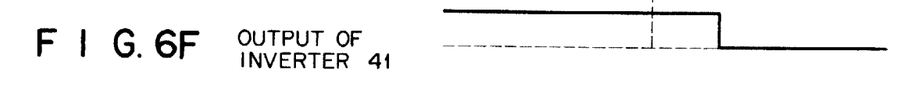

In FIGS. 5A to 5F, the AC signal is at '0' level at time $t_o$ and the '0' level is kept during period $T_2$. In FIGS. 6A to 6F, there are shown wave forms at the respective portions when '1' level is kept during period $T_2$ from time $t_o$. The wave forms shown in FIGS. 6A to 6C may be readily understood and therefore explanation of them will be omitted. Explanation will be given only about the wave forms shown in FIGS. 6D to 6F. As shown in FIG. 6D, a potential at point $Q_2$ gradually decreases from '1' immediately before time $t_o$ to be below the threshold voltage $V_{TH2}$ of the inverter 40 at time $t_2$. Accordingly, output of the inverter 40 is inverted from '0' to '1' at time $t_2$ and the output of the inverter 41 is inverted from '1' to '0' at time $t_2$. Therefore, during the period $T_2$, the switch 7 is opened irrespective of the level of the signal $O_2$.

As described above, when an apparatus, e.g. an air heating apparatus, is subjected to an abnormal control due to a fault of the pulse generator 13 or the microcomputer 12, the operation of the air heating apparatus may be forcibly stopped so that dangerous accident such as fire or explosion may be prevented. The controlled apparatus to which the invention is applied is not always limited to the air heating apparatus.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus controlled by a microprocessor comprising:
   an integrated microprocessor including:
   a time counting logic means supplied with a reference input signal for counting said input signal and producing a first signal,
   a main control logic means receiving said first signal for producing a second signal and at least one output signal for controlling said apparatus, and
   an AC signal generating logic means receiving said first and second signals for producing an AC signal and a third signal, said AC signal being produced at a first operation state of said microprocessor and having a first and second levels repeated alternatively, said third signal being produced at a second operation state of said microprocessor and having one of said first and second levels for a predetermined time period;
   a detecting means for detecting said AC signal to produce a first detection signal and for detecting said third signal to produce a second detecting signal; and
   a protecting means connected to said detecting means and applying a fourth signal to said apparatus for putting said apparatus into a safety condition when said protecting means receives said first detection signal.

2. An apparatus according to claim 1, in which said time counting logic means receives said reference input signal from a pulse generator and includes at least a first counter which counts said reference input signal and produces said first signal every time said first counter counts said input signal for a given time.

3. An apparatus according to claim 2, in which said first counter produces said first signal every time said first counter counts said input signal for 0.1 second.

4. An apparatus according to claim 1, in which said AC signal generating logic circuit comprises a flag memory which stores a flag when said AC signal generating logic means receives said first signal, said flag being cleared when said AC signal generating means receives said second signal, and said AC signal generating logic means further comprises a flip-flop circuit the output of which is inverted every time said flag is cleared therby to produce said AC signal.

5. An apparatus according to claim 4, in which said detecting means comprises a logic circuit connected to said flip-flop circuit and changes its output level from "1" to "0" when said detecting means detects said third signal.

6. An apparatus according to claim 5, in which said logic circuit is comprised of:
   a first capacitor connected at one end to the output of said flip-flop circuit,
   a first diode connected at the anode to the other end of said first capacitor and at the cathode to the positive terminal of a DC source,
   a first resistor connected in parallel with said first diode,
   a first inverter connected between the other end of said first capacitor and one end of a second resistor
   a second capacitor connected between the other end of said second resistor and the positive terminal of said DC source,
   a second diode connected at the anode to said one end of said second resistor and at the cathode to the other end of said second resistor, and
   second and third inverters connected between the other end of said second resistor and the output terminal of said logic circuit.

7. An apparatus according to claim 1, in which said detecting means produces an output of "1" level upon detecting said AC signal and an output of "0" level upon detecting said third signal; and said protecting means includes a first inverter for inverting one of the output of said main control logic means, an AND gate for receiving the output of said first inverter and the output of said detecting means, a second inverter connected to the output of said AND gate; and a relay means is connected between the output of said second inverter and a voltage source for cutting off a switch means provided at a given location of said apparatus when said relay is deenergized by the output of said second inverter.

* * * * *